United States Patent
Akcam et al.

(10) Patent No.: US 12,227,051 B2
(45) Date of Patent: Feb. 18, 2025

(54) SENSOR ARRANGEMENT FOR AN AIR SUSPENSION SYSTEM OF A VEHICLE

(71) Applicant: ZF CV SYSTEMS HANNOVER GMBH, Hannover (DE)

(72) Inventors: Halil Akcam, Hannover (DE); Sebastian Jermis, Springe (DE)

(73) Assignee: ZF CV Systems Hannover GmbH, Hannover (DE)

( * ) Notice: Subject to any disclaimer, the term of this patent is extended or adjusted under 35 U.S.C. 154(b) by 692 days.

(21) Appl. No.: 17/504,146

(22) Filed: Oct. 18, 2021

(65) Prior Publication Data

US 2022/0032717 A1    Feb. 3, 2022

Related U.S. Application Data

(63) Continuation of application No. PCT/EP2020/061431, filed on Apr. 24, 2020.

(30) Foreign Application Priority Data

May 10, 2019    (DE) .................... 10 2019 112 215.5

(51) Int. Cl.
*B60G 17/052* (2006.01)
*B60G 11/27* (2006.01)

(52) U.S. Cl.
CPC .......... *B60G 17/0523* (2013.01); *B60G 11/27* (2013.01); *B60G 2202/152* (2013.01);
(Continued)

(58) Field of Classification Search
CPC ................ B60G 17/0523; B60G 11/27; B60G 2400/51222; B60G 2500/2012;
(Continued)

(56) References Cited

U.S. PATENT DOCUMENTS

2006/0033299 A1* 2/2006 Hecker .............. B60G 17/0155
280/124.16
2013/0206255 A1    8/2013 Helgeson

FOREIGN PATENT DOCUMENTS

DE    36 38 849 A1    5/1988
DE    195 46 324 C2   6/1997
(Continued)

OTHER PUBLICATIONS

WO document No. 89/09703 to Pischke published on Oct. 19, 1989.*

(Continued)

*Primary Examiner* — Pamela Rodriguez
(74) *Attorney, Agent, or Firm* — Walter Ottesen, P.A.

(57) ABSTRACT

A sensor arrangement for an air suspension system of a vehicle has a change-over valve for each air spring of a vehicle axle or of multiple, adjacent tandem axles, and has a shutoff valve for the air spring of each vehicle wheel of the axle or for each of the air springs on each side of the tandem axles. The respective changeover valve and the shutoff valves are structurally combined in a valve block arranged at a distance from the air springs. For measuring the pressure in each of the bellows of the air springs, pressure sensors are arranged in or on the valve block. Each of the pressure sensors is connected at the output of the shutoff valve associated with the sensor to the connection line of the bellows of the associated air spring or of the bellows of the associated air springs.

10 Claims, 3 Drawing Sheets

(52) U.S. Cl.
CPC .............. *B60G 2400/51222* (2013.01); *B60G 2500/2012* (2013.01)

(58) Field of Classification Search
CPC .......... B60G 2202/152; B60G 17/0521; B60G 17/019; B60G 2600/604; G01L 19/0609; G01M 17/04
See application file for complete search history.

(56) References Cited

FOREIGN PATENT DOCUMENTS

| | | | |
|---|---|---|---|
| DE | 10 2004 052 765 A1 | 5/2006 |
| DE | 10 2005 013 914 A1 | 7/2006 |
| EP | 0 170 794 A2 | 2/1986 |

OTHER PUBLICATIONS

German Patent No. DE 10301119 to Bodet published on Nov. 14, 2013.*
European Patent No. EP 3882056 to Jovers et al.published on Sep. 22, 2021.*
Translation of German Patent No. DE 19546324 obtained from website: https://worldwide.espacenet.com on Jul. 8, 2024.*
International Preliminary Report on Patentability dated Nov. 16, 2021 for international application PCT/EP2020/061431 on which this application is based.
Written Opinion of the International Searching Authority dated Aug. 6, 2020 for international application PCT/EP2020/061431 on which this application is based.
International Search Report of the European Patent Office dated Aug. 6, 2020 for international application PCT/EP2020/061431 on which this application is based.

* cited by examiner

SENSOR ARRANGEMENT FOR AN AIR SUSPENSION SYSTEM OF A VEHICLE

CROSS REFERENCE TO RELATED APPLICATIONS

This application is a continuation application of international patent application PCT/EP2020/061431, filed Apr. 24, 2020, designating the U.S. and claiming priority from German application 10 2019 112 215.5, filed May 10, 2019, and the entire content of both applications is incorporated herein by reference.

TECHNICAL FIELD

The disclosure relates to a sensor arrangement for an air suspension system of a vehicle, which has a changeover valve for each of the air springs of a vehicle axle or of multiple, adjacent tandem axles, and has a shutoff valve for the air spring of each vehicle wheel of the vehicle axle or for each of the air springs on each vehicle side of the tandem axles, and in which the respective changeover valve and the shutoff valves are structurally combined in a valve block arranged at a distance from the air springs, in which, for measuring the bellows pressure in each of the spring bellows of the air springs, the air suspension system has a respective pressure sensor, the sensors being arranged in or on the valve block, and in which each of the pressure sensors is connected at the output of the shutoff valve associated with the sensor to the connection line of the spring bellows of the associated air spring or of the spring bellows of the associated air springs.

BACKGROUND

Normally, the air suspension system of a vehicle has a changeover valve, preferably configured as a 3/2-way solenoid switching valve, for each of the air springs of a vehicle axle or of multiple, adjacent tandem axles, and has a shutoff valve, preferably configured as a 2/2-way solenoid switching valve, for the air spring of each vehicle wheel of the vehicle axle or for each of the air springs on each vehicle side of the tandem axles. By means of the changeover valve, a working pressure line can be connected alternately to a vent outlet or a pressure-carrying supply line. The two shutoff valves, by means of which a respective connection line leading to the spring bellows of the associated air spring or to the spring bellows of the associated air springs can be connected alternately to the working pressure line or shut off from the latter, are connected to the working pressure line, for example, by means of a T pipe.

In the unactuated, that is, deenergized, state of the changeover valve, the working pressure line is connected to the vent outlet and is thus unpressurized. In the actuated, that is, energized, state of the changeover valve, the working pressure line is connected to the supply line and is thus under a supply pressure made available by a compressed air system. In the unactuated, that is, deenergized, state of the shutoff valves, these are in each case closed, and the connection lines are shut off from the working pressure line. To lower the bellows pressure in the spring bellows of the associated air spring or in the spring bellows of the associated air springs, all that is required is to open the relevant shutoff valve, thereby releasing air from the one or more spring bellows in each case. To increase the bellows pressure in the spring bellows of the associated air spring or in the spring bellows of the associated air springs, on the other hand, the switching over of the changeover valve and the opening of the relevant shutoff valve are required, as a result of which air is admitted to the one or more spring bellows in each case.

To determine the height or level of the vehicle body relative to a vehicle axle, a height or level sensor connected via a sensor line to an electronic control unit is arranged on each side of each vehicle axle or, in the case of adjacent tandem axles, at least of one of the tandem axles. To determine the bellows pressures in the spring bellows of the air springs, a pressure sensor connected by a sensor line to the electronic control unit is connected to the connection line of each spring bellows of one vehicle axle or, in the case of tandem axles, of the spring bellows on one vehicle side. Depending on the sensor signals from the height sensors and the pressure sensors and on setpoint data specified by a control program or input manually by a driver, the changeover and shutoff valves are controlled by the electronic control unit via electric control lines in order to maintain or adjust a specified height of the vehicle body by the admission or release of air to or from the spring bellows of the relevant air springs.

The pressure sensors can be connected to the respective connection line at a point directly adjacent to the air springs. This has the advantage that the respective bellows pressure in the spring bellows of the adjacent air spring can be measured largely without distortion, even in the case of dynamic pressure changes. However, the disadvantages with such a decentralized arrangement of the pressure sensors are the required long sensor lines, the increased assembly effort and the exposure of the pressure sensors and their electric plugs to dirt and spray. A decentralized arrangement of the pressure sensors close to the air springs is known from an air suspension system described in DE 36 38 849 A1, for example.

As an alternative, the pressure sensors may also be arranged remote from the air springs in or on the respective valve block and connected at the outlet of the associated shutoff valve to the connection line. The advantages with such a centralized arrangement of the pressure sensors are the required short sensor lines, the lower assembly effort and the largely protected position of the pressure sensors and their electric plugs in respect of dirt and spray. However, this arrangement remote from the air springs has the disadvantage that the respective bellows pressure in the spring bellows of the adjacent air spring is detected in a distorted way by the pressure sensors, especially during the dynamic pressure changes during the opening and closing of the associated shutoff valve. A centralized arrangement of the pressure sensors in an air suspension system control block which, in addition to the control valves, also includes an electronic control unit is known from DE 195 46 324 C2, for example.

SUMMARY

Since accurate control of air admission and release to and from the spring bellows is not yet possible on the basis of the sensed air pressures, it is an underlying object of the disclosure to provide a sensor arrangement for an air suspension system of a vehicle of the configuration mentioned at the outset via which the bellows pressure in the spring bellows of the air springs can nevertheless be determined exactly.

This object can, for example, be achieved by a sensor arrangement for an air suspension system of a vehicle, the vehicle having a vehicle axle with wheels or multiple, adjacent tandem axles defining two vehicle sides, the air suspension system having a changeover valve for air springs of the vehicle axle or multiple, adjacent tandem axles, the air suspension system further having a shutoff valve for the air spring of each vehicle wheel of the vehicle axle or for each air spring on each vehicle side of the multiple, adjacent tandem axles, the corresponding changeover valve and shutoff valves being structurally combined in a valve block arranged at a distance from the air springs, the sensor arrangement comprising: a plurality of pressure sensors, wherein each one of the plurality is provided for measuring a bellows pressure in one spring bellows of the air springs; the pressure sensors being arranged in or on the valve block; each of the plurality of pressure sensors being connected at an output of a corresponding one of the shutoff valves to a connection line of the spring bellows of the corresponding air spring or the spring bellows of the corresponding air springs; a plurality of filter arrangements acting as low-pass filters; and, each of the pressure sensors being connected to the connection line of the spring bellows of the corresponding air spring or of the spring bel-lows of the corresponding air springs via one of the plurality of filter arrangements.

Accordingly, the disclosure relates to a sensor arrangement for an air suspension system of a vehicle, which has a changeover valve for each of the air springs of a vehicle axle or of multiple, adjacent tandem axles, and has a shutoff valve for the air spring of each vehicle wheel of the vehicle axle or for each of the air springs on each vehicle side of the tandem axles, and in which the respective changeover valve and the shutoff valves are structurally combined in a valve block arranged at a distance from the air springs, in which, for measuring the bellows pressure in each of the spring bellows of the air springs, the air suspension system has a respective pressure sensor, the sensors being arranged in or on the valve block, and in which each of the pressure sensors is connected at the output of the shutoff valve associated with the sensor to the connection line of the spring bellows of the associated air spring or of the spring bellows of the associated air springs.

According to the disclosure, provision is made in this sensor arrangement, for the sake of achieving the stated object, for each pressure sensor to be connected, via a filter arrangement acting as a low-pass filter, to the connection line of the spring bellows of the associated air spring or of the spring bellows of the associated air springs.

By connecting the pressure sensors to the connection line of the spring bellows of the associated air spring or to the spring bellows of the associated air springs in each case via a filter arrangement acting as a low-pass filter, the pressure peaks and pressure fluctuations caused, in particular, by the opening and closing of the associated shutoff valve are damped and filtered out in such a way that the air pressures $p_S$ detected via the connected pressure sensors largely correspond to the bellows pressures $p_B$ in the spring bellows of the associated air springs ($p_S = p_B$).

The filter arrangements can each preferably include a restrictor and a relatively small pressure reservoir, which are each arranged in series between the associated connection line and the relevant pressure sensor. The volume of the pressure reservoirs is smaller than the smallest possible volume of the respectively associated spring bellows.

In order to be able to perform accurate adaptation of the filter arrangements to the dimensions of the respective connection line and of the spring bellows of the associated air spring or spring bellows of the associated air springs, the restrictors of the filter arrangements can preferably be of adjustable configuration in respect of their opening cross section.

In order to achieve the desired effect as a low-pass filter, provision can preferably be made for the restrictor and the pressure reservoir of the filter arrangements each to be dimensioned in such a way that the ratio of the square of the greatest possible opening diameter $d_{DR\_max}$ of the restrictor to the volume $V_{DB}$ on the pressure reservoir is at least as great as the ratio of the square of the line diameter $d_{AL}$ of the associated connection line to the smallest possible volume $V_{B\_min}$ of the spring bellows of the associated air spring or of the spring bellows of the associated air springs ($d_{DR\_max}^2/V_{DB} \geq d_{AL}^2/V_{B\_min}$).

BRIEF DESCRIPTION OF THE DRAWINGS

The invention will now be described with reference to the drawings wherein.

DESCRIPTION OF THE PREFERRED EMBODIMENTS

Figure 1:
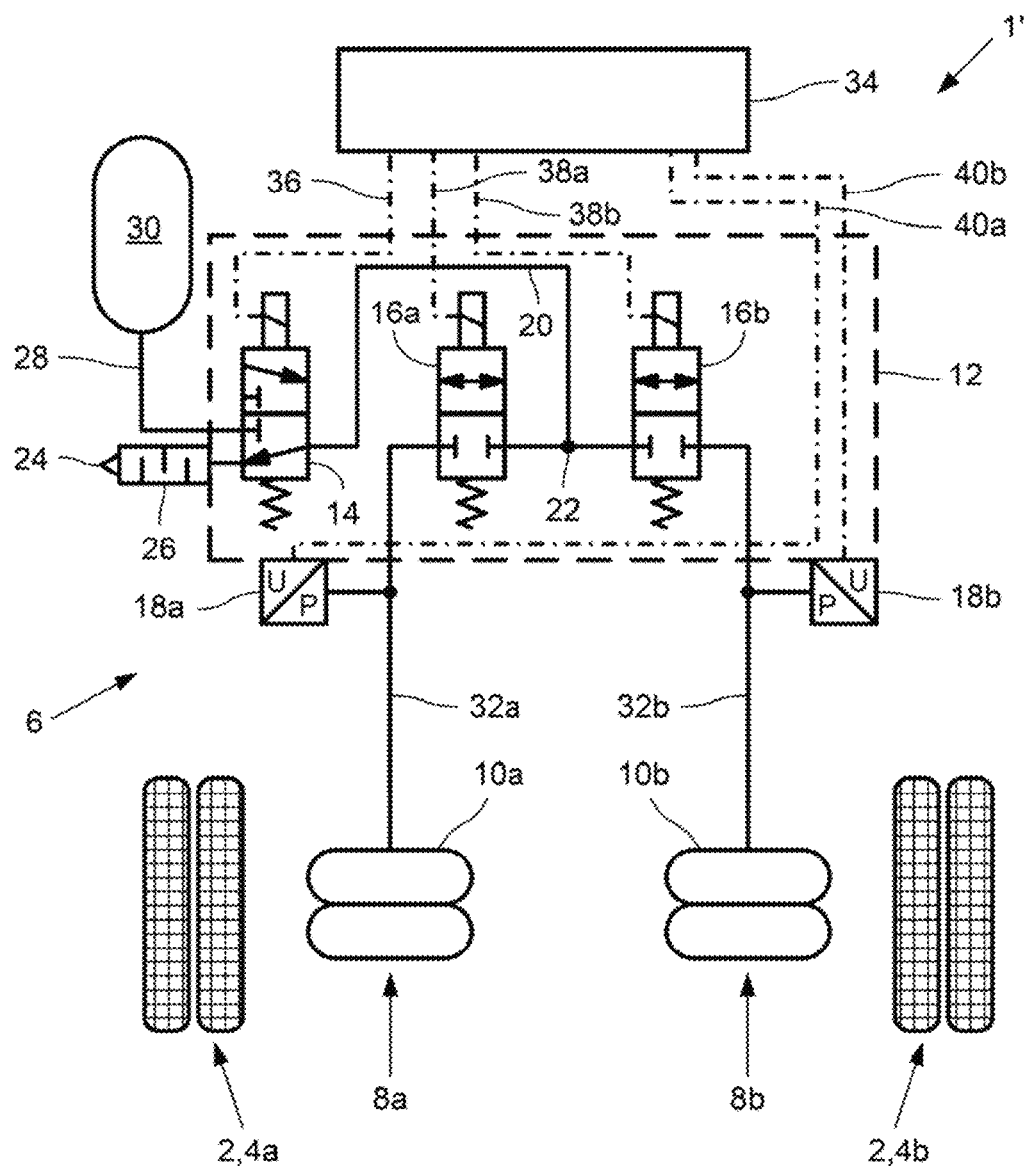
FIG. 1 shows an air suspension system for a vehicle axle of a vehicle having a centralized arrangement of pressure sensors in a schematic view.

An air suspension system 6, depicted schematically in FIG. 1, for a vehicle axle 2 of a vehicle includes an air spring 8a, 8b having a spring bellows 10a, 10b for each vehicle wheel 4a, 4b of the vehicle axle 2, a valve block 12 having a changeover valve 14, configured as a 3/2-way solenoid switching valve, a shut off valve 16a, 16b, configured as a 2/2-way solenoid switching valve, for the air spring 8a, 8b of each vehicle wheel 4a 4b, and a pressure sensor 18a, 18b for measuring the bellows pressure in each of the spring bellows 10a, 10b of the air springs 8a, 8b. Here, the pressure sensors 18a, 18b are pressure-voltage transducers and form a sensor arrangement 1'.

Via the changeover valve 14, which is connected by an electric control line 36 to an electronic control unit 34, a working pressure line 20 can be connected alternately to a vent outlet 24 provided with a muffler 26 or to a pressure-carrying supply line 28. Connected to the supply line 28 is a storage reservoir 30, in which compressed air is stored under a supply pressure. Via the two shutoff valves 16a, 16b, which are connected on the inlet side, via a T piece 22, to the working pressure line 20 and are each connected by an electric control line 38a, 38b to the electronic control unit 34 in terms of signal transmission, a respective connection line 32a, 32b leading to the spring bellows 10a, 10b of the associated air spring 8a, 8b can alternately be connected to the working pressure line 20 or shut off from the latter.

In the unactuated, that is, deenergized, state of the changeover valve 14, the working pressure line 20 is connected to the vent outlet 24 and is thus unpressurized. In the actuated, that is, energized, state of the changeover valve 14, the working pressure line 20 is connected to the supply line 28 and is thus under the supply pressure of the storage reservoir 30.

In the unactuated, that is, deenergized, state of the shutoff valves 16a, 16b, these are in each case closed, and the connection lines 32a, 32b are shut off from the working pressure line 20. To lower the bellows pressure in the spring bellows 10a, 10b of the associated air spring 8a, 8b, all that is required is to open the relevant shutoff valve 16a, 16b, as a result of which air is released from the respective spring bellows 10a, 10b. To increase the bellows pressure in the spring bellows 10a, 10b of the associated air spring 8a, 8b, on the other hand, the switching over of the changeover valve 14 and the opening of the relevant shutoff valve 16a, 16b are required, as a result of which air is admitted to the respective spring bellows 10a, 10b.

The pressure sensors 18a, 18b are arranged in or on the valve block 12 and are each connected at the outlet of the associated shutoff valve 16a, 16b to the connection line 32a, 32b of the spring bellows 10a, 10b of the associated air spring 8a, 8b. The pressure sensors 18a, 18b are each connected to the electronic control unit 34 by a respective electric sensor line 40a, 40b.

Figure 2:
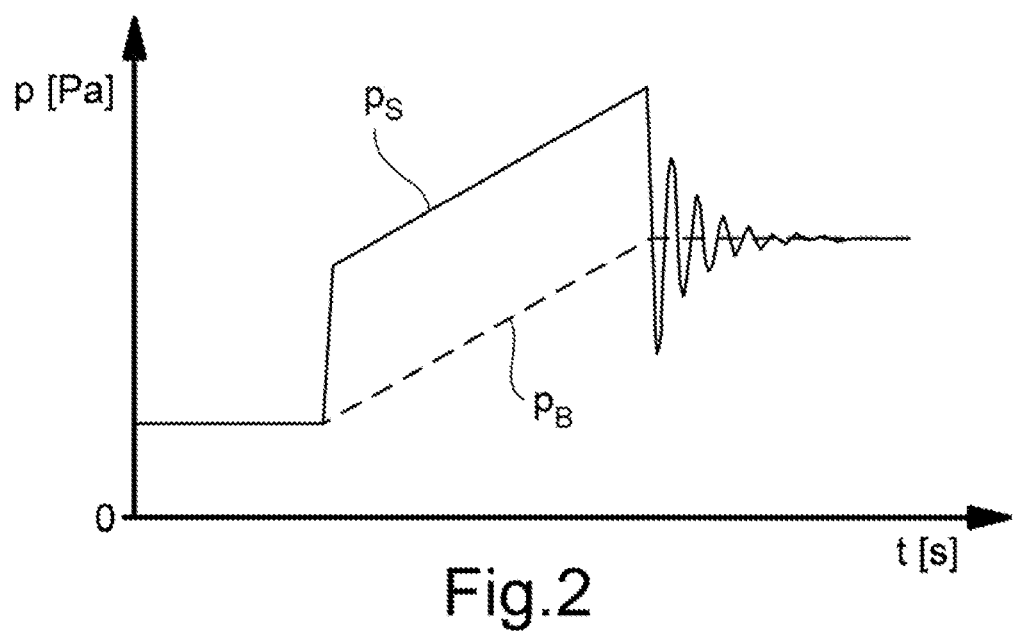
FIG. 2 shows the pressure curves for the bellows pressure of a spring bellows and for the pressure detected by a pressure sensor during an air admission process in a diagram; and, FIG. 3 shows an air suspension system for a vehicle axle of a vehicle having a sensor arrangement according to the disclosure in a schematic view.

As illustrated by way of example in the diagram of FIG. 2 for air admission to the spring bellows 10a, 10b of an air spring 8a, 8b, the bellows pressure $p_B$ present in the relevant spring bellows 10a, 10b and the air pressure $p_S$ present at the outlet of the associated shutoff valve 16a, 16b and detected by the associated pressure sensor 18a, 18b deviate to a relatively great extent from one another during the air admission process since pressure peaks and pressure fluctuations occur at the outlet of the relevant shutoff valve 16a, 16b owing to the opening and closing thereof. Accurate control of air admission and release to and from the spring bellows 10a, 10b on the basis of the sensed air pressures $p_S$ is thus not yet possible via the sensor arrangement 1' shown in FIG. 1.

Figure 3:
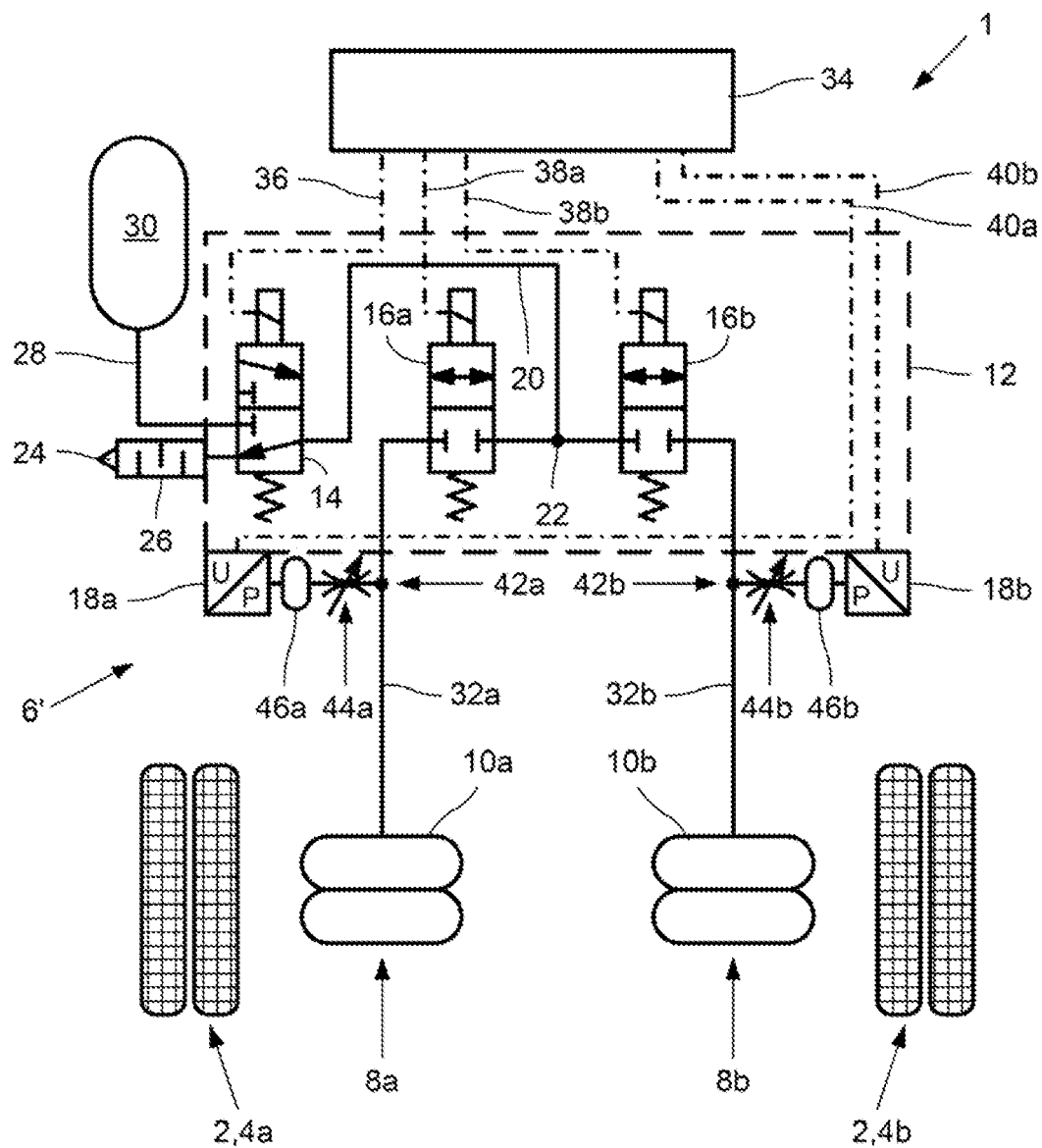

To solve this problem, a sensor arrangement 1 according to the disclosure is provided, which is illustrated in the schematic depiction of a corresponding air suspension system 6' for a vehicle axle 2 of a vehicle in FIG. 3. The pressure sensors 18a 18b are now each connected, via a filter arrangement 42a, 42b acting as a low-pass filter, to the connection line 32a, 32b of the spring bellows 10a, 10b of the associated air spring 8a, 8b. The filter arrangements 42a, 42b each include a pneumatic restrictor 44a, 44b and a relatively small pressure reservoir 46a, 46b, which are each arranged in series between the associated connection line 32a, 32b and the relevant pressure sensor 18a, 18b. Here, the volume of the respective pressure reservoirs 46a, 46b is smaller than the smallest possible volume that can be set for the respectively associated spring bellows 10a, 10b.

By connecting the pressure sensors 18a, 18b to the connection line 32a, 32b of the spring bellows 10a, 10b of the associated air spring 8a, 8b in each case via a filter arrangement 42a, 42b acting as a low-pass filter, the pressure peaks and pressure fluctuations caused, in particular, by the opening and closing of the associated shutoff valve 16a, 16b are damped and filtered out in such a way that the air pressures $p_S$ measured via the connected pressure sensors 18a, 18b largely correspond to the bellows pressures $p_B$ in the spring bellows 10a, 10b of the associated air springs 8a, 8b.

The restrictors 44a, 44b of the filter arrangements 42a, 42b are of adjustable configuration in respect of their opening cross section, allowing accurate adaptation of the filter arrangements 42a, 42b to the dimensions of the respective connection line 32a, 32b and of the spring bellows 10a, 10b of the associated air spring 8a, 8b. In order to achieve the desired effect as a low-pass filter, the restrictor 44a, 44b and the pressure reservoir 46a, 46b of the filter arrangements 42a, 42b are each dimensioned in such a way that the ratio of the square of the greatest possible opening diameter $d_{DR\_max}$ of the restrictor 44a, 44b to the volume $V_{DB}$ of the pressure reservoir 46a, 46b is at least as great as the ratio of the square of the line diameter $d_{AL}$ of the associated connection line 32a, 32b to the smallest possible volume $V_{B\_min}$ of the spring bellows 10a, 10b of the associated air spring 8a, 8b ($d_{DR\_max}^2/V_{DB} \geq d_{AL}^2/V_{B\_min}$).

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1 sensor arrangement (according to the disclosure)
1' sensor arrangement
2 vehicle axle
4a, 4b vehicle wheels
6, 6' air suspension systems
8a, 8b air springs
10a, 10b spring bellows
12 valve block
14 changeover valve
16a, 16b shutoff valves
18a, 18b pressure sensors
20 working pressure line
22 T piece
24 vent outlet
26 muffler
28 supply line
30 storage reservoir
32a, 32b connection line
34 electronic control unit
36 control line
38a, 38b control line
40a, 40b sensor line
42a, 42b filter arrangement
44a, 44b restrictor
46a, 46b pressure reservoir
d diameter
$d_{AL}$ diameter of the connection line
$d_{DR}$ opening diameter of the restrictor
$d_{DR\_max}$ greatest possible opening diameter of the restrictor
p pressure
$p_B$ bellows pressure
$p_S$ sensed air pressure
V volume
$V_B$ volume of the one or more spring bellows
$V_{B\_min}$ smallest possible volume of the one or more spring bellows
$V_{DB}$ volume of the pressure reservoir

What is claimed is:

1. A sensor arrangement for an air suspension system of a vehicle, the vehicle having a vehicle axle with wheels or multiple, adjacent tandem axles defining two vehicle sides, the air suspension system having a changeover valve for air springs of the vehicle axle or multiple, adjacent tandem axles, the air springs including corresponding spring bellows, the air suspension system further having a shutoff valve for the air spring of each vehicle wheel of the vehicle axle or for each air spring on each vehicle side of the multiple, adjacent tandem axles, each of the shutoff valves generating air pressure peaks and air pressure fluctuations when opening and closing, the corresponding changeover valve and shutoff valves being structurally combined in a valve block arranged at a distance from the air springs, the sensor arrangement comprising:
- a plurality of pressure sensors, wherein each of the spring bellows of the air springs has one of said plurality of pressure sensors associated therewith for measuring a bellows pressure in the associated spring bellows of the air springs;
- said plurality of pressure sensors being arranged in or on the valve block;
- each of said plurality of pressure sensors being connected at an output of a corresponding one of the shutoff valves to a connection line of the spring bellows of the corresponding air spring or the spring bellows of the corresponding air springs;
- a plurality of filter arrangements acting as low-pass filters to dampen and filter out the air pressure peaks and air pressure fluctuations caused by the opening and closing of the associated shutoff valve so as to cause the air pressure detected via the corresponding one of the pressure sensors to largely correspond to a bellows air pressure in the spring bellows of the associated air spring; and,
- each of said pressure sensors being connected to the connection line of the spring bellows of the corresponding air spring or of the spring bellows of the corresponding air springs via one of said plurality of filter arrangements.

2. The sensor arrangement of claim 1, wherein said plurality of filter arrangements each include a restrictor and a pressure reservoir; and, said restrictor and said pressure reservoir of each filter arrangement are arranged between corresponding ones of the connection lines and said plurality of pressure sensors.

3. The sensor arrangement of claim 2, wherein the pressure reservoirs have a volume smaller than a smallest possible volume of the corresponding spring bellows.

4. The sensor arrangement of claim 2, wherein said restrictors of said filter arrangements each define an opening cross section; and, said plurality of filter arrangements are configured such that said opening cross sections are adjustable.

5. A sensor arrangement for an air suspension system of a vehicle, the vehicle having a vehicle axle with wheels or multiple, adjacent tandem axles defining two vehicle sides, the air suspension system having a changeover valve for air springs of the vehicle axle or multiple, adjacent tandem axles, the air springs including corresponding spring bellows, the air suspension system further having a shutoff valve for the air spring of each vehicle wheel of the vehicle axle or for each air spring on each vehicle side of the multiple, adjacent tandem axles, the corresponding changeover valve and shutoff valves being structurally combined in a valve block arranged at a distance from the air springs, the sensor arrangement comprising:
- a plurality of pressure sensors, wherein each of the spring bellows of the air springs has one of said plurality of pressure sensors associated therewith for measuring a bellows pressure in the associated spring bellows of the air springs;
- said plurality of pressure sensors being arranged in or on the valve block;
- each of said plurality of pressure sensors being connected at an output of a corresponding one of the shutoff valves to a connection line of the spring bellows of the corresponding air spring or the spring bellows of the corresponding air springs;
- a plurality of filter arrangements acting as low-pass filters;
- each of said pressure sensors being connected to the connection line of the spring bellows of the corresponding air spring or of the spring bellows of the corresponding air springs via one of said plurality of filter arrangements;
- wherein said plurality of filter arrangements each include a restrictor and a pressure reservoir; and, said restrictor and said pressure reservoir of each filter arrangement are arranged between corresponding ones of the connection lines and said plurality of pressure sensors; and,
- wherein said restrictors and said pressure reservoirs of said plurality of filter arrangements are each dimensioned such that a ratio of a square of a greatest possible opening diameter ($d_{DR\_max}$) of said restrictors to a volume ($V_{DB}$) of said pressure reservoirs is at least as great as a ratio of a square of the line diameter ($d_{AL}$) of a corresponding connection line to a smallest possible volume ($V_{B\_min}$) of the spring bellows of the corresponding air spring or of the spring bellows of the corresponding air springs ($d_{DR\_max}^2/V_{DB} \geq d_{AL}^2/V_{B\_min}$).

6. An air suspension system of a vehicle, the vehicle having a vehicle axle with wheels or multiple, adjacent tandem axles defining two vehicle sides; the air suspension system comprising:
- a changeover valve for air springs of the vehicle axle or multiple, adjacent tandem axles;
- the air springs including corresponding spring bellows;
- a shutoff valve for the air spring of each vehicle wheel of the vehicle axle or for each air spring on each vehicle side of the multiple, adjacent tandem axles;
- each of the shutoff valves generating air pressure peaks and air pressure fluctuations when opening and closing;
- the corresponding changeover valve and shutoff valves being structurally combined in a valve block arranged at a distance from the air springs; and,
- a sensor arrangement including:
- a plurality of pressure sensors, wherein each of the spring bellows of the air springs has one of said plurality of pressure sensors associated therewith for measuring a bellows pressure in the associated spring bellows of the air spring;
- said plurality of pressure sensors being arranged in or on the valve block;
- each of said plurality of pressure sensors being connected at an output of a corresponding one of the shutoff valves to a connection line of the spring bellows of the corresponding air spring or the spring bellows of the corresponding air spring;
- a plurality of filter arrangements acting as low-pass filters to dampen and filter out the air pressure peaks and air pressure fluctuations caused by the opening and closing of the associated shutoff valve so as to cause the air pressure detected via the corresponding one of the pressure sensors to largely correspond to a bellows air pressure in the spring bellows of the associated air spring; and,
- each of said pressure sensors being connected to the connection line of the spring bellows of the corresponding air spring or of the spring bellows of the corresponding air springs via one of said plurality of filter arrangements.

7. The air suspension system of claim 6, wherein said plurality of filter arrangements each include a restrictor and a pressure reservoir; and, said restrictor and said pressure reservoir of each filter arrangement are arranged between corresponding ones of the connection lines and said plurality of pressure sensors.

8. The air suspension system of claim 7, wherein the pressure reservoirs have a volume smaller than a smallest possible volume of the corresponding spring bellows.

9. The air suspension system of claim 7, wherein said restrictors of said filter arrangements each define an opening cross section; and, said plurality of filter arrangements are configured such that said opening cross sections are adjustable.

10. The air suspension system of claim 7, wherein said restrictors and said pressure reservoirs of said plurality of filter arrangements are each dimensioned such that a ratio of a square of a greatest possible opening diameter ($d_{DR\_max}$) of said restrictors to a volume ($V_{DB}$) of said pressure reservoirs is at least as great as a ratio of a square of the line diameter ($d_{AL}$) of a corresponding connection line to a smallest possible volume ($V_{B\_min}$) of the spring bellows of the corresponding air spring or of the spring bellows of the corresponding air springs ($d_{DR\_max}^2/V_{DB} \geq d_{AL}^2/V_{B\_min}$).

* * * * *